(12) United States Patent
Gao et al.

(10) Patent No.: US 12,315,246 B2
(45) Date of Patent: May 27, 2025

(54) REMOTE SENSING-BASED EXTRACTION METHOD FOR TYPE OF RIVER CHANNEL

(71) Applicants: Satellite Application Center for Ecology and Environment, MEE, Beijing (CN); Aerospace Information Research Institute, Chinese Academy of Sciences, Beijing (CN)

(72) Inventors: Jixi Gao, Beijing (CN); Sihan Liu, Beijing (CN); Shudong Wang, Beijing (CN); Dai'an You, Beijing (CN); Jiahua Teng, Beijing (CN); Mingyong Cai, Beijing (CN); Zhuo Fu, Beijing (CN)

(73) Assignees: Satellite Application Center for Ecology and Environment, MEE (CN); Aerospace Information Research Institute, Chinese Academy of Sciences (CN)

( * ) Notice: Subject to any disclaimer, the term of this patent is extended or adjusted under 35 U.S.C. 154(b) by 385 days.

(21) Appl. No.: 18/090,656

(22) Filed: Dec. 29, 2022

(65) Prior Publication Data
US 2023/0215167 A1    Jul. 6, 2023

(30) Foreign Application Priority Data
Dec. 31, 2021    (CN) .......................... 202111670892.2

(51) Int. Cl.
G06V 20/10    (2022.01)
(52) U.S. Cl.
CPC .......... *G06V 20/182* (2022.01); *G06V 20/188* (2022.01)

(58) Field of Classification Search
CPC .. G06V 20/182; G06V 20/188; G06V 20/194; G06V 20/13
See application file for complete search history.

(56) References Cited

U.S. PATENT DOCUMENTS 9,721,181 B2 *   8/2017   Guan ................... G06F 18/2411
9,875,430 B1 *   1/2018   Keisler ..................... G06T 5/77
(Continued)

FOREIGN PATENT DOCUMENTS

CN    112528871 A    3/2021

OTHER PUBLICATIONS

Gordillo et al., "Monitoring of Emerging Water Stress Situations by Thermal and Vegetation Indices in Different Almond Cultivars" (pp. 1-16) (Year: 2021).*

(Continued)

*Primary Examiner* — Manav Seth
(74) *Attorney, Agent, or Firm* — Dickinson Wright PLLC

(57) ABSTRACT

The present disclosure discloses a remote sensing-based extraction method for a type of a river channel, including: obtaining multi-source remote sensing data of a target area including a river channel; preprocessing the multi-source remote sensing data, and obtaining corresponding reflectance data; according to the reflectance data, analyzing a water index and a vegetation index of the target area; and according to the water index and the vegetation index, constructing first preset conditions for determining whether there is water in the river channel and second preset conditions for determining whether the river channel is a non-dry river channel to determine the type of the river channel. Types of river channels can be divided into four types: non-dry river channels, seasonal dry river channels, temporary water channels, and dry river channels.

18 Claims, 1 Drawing Sheet

(56) References Cited

U.S. PATENT DOCUMENTS

| | | | | |
|---|---|---|---|---|
| 10,108,885 B1* | 10/2018 | Keisler | ............... | G06V 20/188 |
| 10,217,192 B1* | 2/2019 | Chartrand | .............. | G06V 10/50 |
| 10,467,472 B2* | 11/2019 | Guan | ................... | G06V 20/188 |
| 10,564,316 B2* | 2/2020 | Xu | ......................... | G16C 99/00 |

OTHER PUBLICATIONS

Aires et al., "The Use of the Normalized Difference Vegetation Index to Analyze the Influence of Vegetation Cover Changes on the Streamflow in the Manhuaçu River Basin, Brazil" (pp. 1933-1949) (Year: 2020).*

Chinese Office Action for Chinese Application No. 202111670892. 2, dated Jul. 22, 2022, pp. 1-4.

* cited by examiner

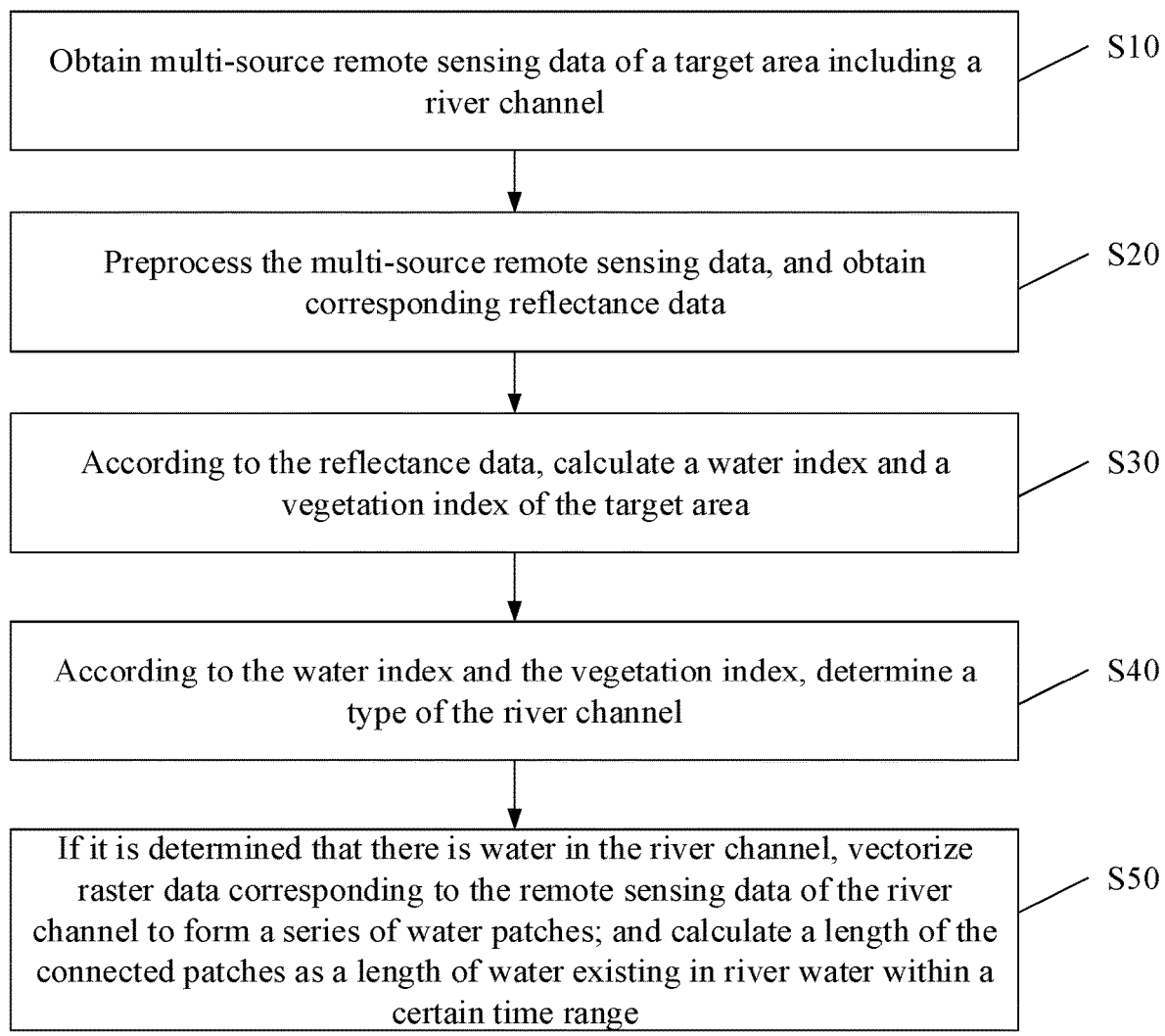

REMOTE SENSING-BASED EXTRACTION METHOD FOR TYPE OF RIVER CHANNEL

CROSS REFERENCE TO RELATED APPLICATION

This patent application claims the benefit and priority of Chinese Patent Application No. 202111670892.2, filed with the China National Intellectual Property Administration on Dec. 31, 2021, the disclosure of which is incorporated by reference herein in its entirety as part of the present application.

TECHNICAL FIELD

The present disclosure relates to the fields of water resources and remote sensing, and in particular, to a remote sensing-based extraction method for a type of a river channel.

BACKGROUND

According to the existing water state, the river channels can be divided into four types: non-dry river channels, seasonal dry river channels, temporary water channels, and dry river channels.

The state of the water in the river channel is related to the river ecosystem, water resource utilization, water resource management, and sustainable development of social economy. At present, due to the impact of unreasonable water use, river channel management, and global change, a large number of dry and seasonal dry river channels are emerging, which is accompanied with more problems such as river damage and over-exploitation of groundwater.

At present, some progress has been made in using the remote sensing technology to monitor the state of river water flow or water resources, such as identifying the information of river water through remote sensing models and methods, and identifying whether there is water in the river channel according to the numerical difference of the water spectrum and the water index indicated by the dry river. However, the water in the river channels often has temporary and seasonal changes due to different uses. Due to the obvious change characteristics of the underlying surface of the river, the continuous and rapid changes of dry river channels, water channels, and river channels in wet seasons pose serious challenges to the above methods for remote sensing of a type of a river channel.

Therefore, there are situations such as dry river channels, river channels in wet seasons, and river channels with fluctuating water levels on the underlying surface of the river channel, which especially brings uncertainty to the method for remote sensing monitoring of the occurrence of large area river water.

SUMMARY

A main objective of the present disclosure is to provide a remote sensing-based extraction method for a type of a river channel that at least partially solves the above-mentioned technical problems. This method considers dynamic change characteristics of an underlying surface of a seasonal river channel, as well as change characteristics in water and nearby vegetation in a time series, and corresponding solutions are provided on this basis.

To achieve the above objective, the technical solution adopted by the present disclosure is as follows:

The present disclosure provides a remote sensing-based extraction method for a type of a river channel, including:
S10, obtaining multi-source remote sensing data of a target area including a river channel;
S20, preprocessing the multi-source remote sensing data, and obtaining corresponding reflectance data;
S30, according to the reflectance data, calculating a water index and a vegetation index of the target area; and
S40, according to the water index and the vegetation index, determining the type of the river channel.

In an embodiment, in step S20, a process of preprocessing the multi-source remote sensing data includes:
performing geometric, radiometric, and atmospheric correction processing on the multi-source remote sensing data.

In an embodiment, step S30 includes:
if the multi-source remote sensing data is a remote sensing image with more than four bands, obtaining a normalized difference vegetation index (NDVI) and an modified normalized difference water index (MNDWI); and
if the multi-source remote sensing data is a remote sensing image with four bands, obtaining an NDVI and a normalized difference water index (NDWI)-NDVI.

In an embodiment, the MNDWI is expressed as:

$$MNDWI = \frac{R_g - R_{swir}}{R_{swir} + R_g}, \quad (1)$$

where in the formula (1), MNDWI is the modified normalized difference water index; and $R_{swir}$ is reflectance in a short-wave infrared (SWIR) band, and $R_g$ is reflectance in a red light band.

The NDWI-NDVI is expressed as:

$$NDWI - NDVI = \frac{R_g - R_{nir}}{R_g + R_{nir}} - NDVI, \quad (2)$$

where in the formula (2), NDVI is the normalized difference vegetation index, NDWI is the normalized difference water index, and $R_{nir}$ is reflectance in a near-infrared (NIR) band.

In an embodiment, the NDVI is expressed as:

$$NDVI = \frac{R_{nir} - R_r}{R_{nir} + R_r}, \quad (3)$$

where in the formula (3), NDVI is the normalized difference vegetation index, and $R_{nir}$ is the reflectance in the NIR band; and $R_r$ is reflectance in a red band.

In an embodiment, step S40 includes:
according to the water index and the vegetation index, constructing first preset conditions for determining whether there is water in the river channel and second preset conditions for determining whether the river channel is a non-dry river channel to determine the type of the river channel.

In an embodiment, the first preset conditions for determining whether there is water in the river channel include:
1) during identification of a pixel of a non-ice and snow-covered river channel, if $MNDWI_{t0} \geq a_1$ is satisfied, or $MNDWI_{ti} < a_1$, $NDVI_{ti} \geq a_2$, $MNDWI_{ti-tj} \geq a_1$, and $NDVI_{ti-tj} < a_2$ are satisfied, determining that the river channel is a river channel with water, where $MNDWI_{t0}$, $MNDWI_{ti}$, $MNDWI_{ti-tj}$, $NDVI_{ti}$, and $NDVI_{ti-tj}$ are corresponding MNDWIs and NDVIs at times t0, ti, and ti-tj respectively; and $a_1$ and $a_2$ are a first preset threshold and a second preset threshold respectively; and 2) during identification of a pixel of an ice and snow-covered river channel, constructing an ice and snow coverage model index $$IS = \frac{R_g - R_{nir}}{R_{nir} + R_g}$$

and an ice and snow reflection intensity model index $IT=R_g^2+R_r^2+R_{nir}^2$, and if $IS \geq a_3$ and $IT \geq a_4$, determining that the ice and snow-covered river channel is a river channel with water, where $a_3$ and $a_4$ are a third preset threshold and a fourth preset threshold respectively.

In an embodiment, the second preset conditions for determining whether the river channel is a non-dry river channel include:

3) establishing a non-dry river channel identification index for a non-ice and snow-covered season time series:

$$NISI = \sqrt{\sum_{i=1}^{n_1} \frac{(NDW_i - \overline{NDW})^2}{n_1}},$$

if $\overline{NDW} \geq a_5$ is satisfied, determining that the river channel of the non-ice and snow-covered season time series is a non-dry river channel, where in the formula, NISI is a non-dry pixel index; NDW is a non-negative water value, $NDW=MNDWI+b_1$, where $b_1$ is a preset threshold; $\overline{NDW}$ is an average value in a statistical time range; $a_5$ is a fifth preset threshold; $n_1$ is a number of statistical image scenes of the non-ice and snow-covered season time series; and i is an index value of the number of the statistical image scenes of the non-ice and snow-covered season time series; and 4) establishing a non-dry river channel identification model for an ice and snow-covered season time series:

$$ISI = \sqrt{\sum_{i=1}^{n_2} \frac{(IS_i - \overline{IS})^2}{n_2}},$$

if $\overline{IS} \geq a_6$ is satisfied, and $$ITI = \sqrt{\sum_{i=1}^{n_2} \frac{(IT_i - \overline{IT})^2}{n_2}},$$

if $\overline{IT} \geq a_7$ is satisfied, determining that the river channel of the ice and snow-covered season time series is a non-dry river channel, where in the formula, ISI and ITI are an ice and snow coverage index and an ice and snow reflection intensity index respectively; $\overline{IS}$ and $\overline{IT}$ are an average ice and snow coverage model index and an average ice and snow reflection intensity model index in a statistical time range respectively; $a_6$ is a sixth preset threshold, and $a_7$ is a seventh preset threshold; and $n_2$ is a number of statistical image scenes of the ice and snow-covered season time series.

In an embodiment, a process of determining the type of the river channel in step S40 includes:

A, if 3) and 4) in the second preset conditions for determining whether the river channel is a non-dry river channel are both satisfied, determining that the river channel is a non-dry river channel;

B, if only one of 3) and 4) in the second preset conditions for determining whether the river channel is a non-dry river channel is satisfied, determining that the river channel is a seasonal dry river channel; or if 3) and 4) in the second preset conditions for determining whether the river channel is a non-dry river channel are not satisfied, but in a t1 to t2 time range of a precipitation season, the non-dry river channel identification index for the non-ice and snow-covered season time series is as follows:

$$NISI = \sqrt{\sum_{i=1}^{n_3} \frac{(NDW_i - \overline{NDW})^2}{n_3}},$$

$\overline{NDW} \geq a_8$ is satisfied, determining that the river channel is a seasonal dry river channel of the non-ice and snow-covered season time series, where NISI is the non-dry river channel identification index; and $n_3$ is a number of statistical pixels of the non-ice and snow-covered season time series in the t1 to t2 time range of the precipitation season; and C, during remote sensing monitoring of river water in a time series, if 1) in the first preset conditions for determining whether there is water in the river channel is satisfied within a certain time range, and a total time interval for monitoring water t is less than $\Delta t1$, and is not within the t1 to t2 time range of the precipitation season, determining that the river channel is a temporary water channel, where $\Delta t1$ is a preset time threshold.

In an embodiment, the method further includes:

S50, if it is determined that there is water in the river channel, vectorizing raster data corresponding to the remote sensing data of the river channel to form a series of water patches; and calculating a length of the connected patches as a length of water existing in the river water within a certain time range.

Compared with the prior art, the present disclosure has the following beneficial effects:

The remote sensing-based extraction method for a type of a river channel includes: obtaining multi-source remote sensing data of a target area including a river channel; preprocessing the multi-source remote sensing data, and obtaining corresponding reflectance data; according to the reflectance data, analyzing a water index and a vegetation index of the target area; and according to the water index and the vegetation index, determining the type of the river channel. The present disclosure has advantages that the present disclosure aims to provide a seasonal dry river channel for monitoring and management of the ecological environment of river channels on the basis of fully considering change characteristics of an underlying surface of a seasonal dry river channel and a river channel in a wet season and a fluctuating period and spectral characterization of multi-source remote sensing data, and provides a remote sensing prediction method for predicting a type of a river channel on this basis, which has high identification accuracy.

BRIEF DESCRIPTION OF THE DRAWINGS

FIG. 1 is a flow chart of a remote sensing-based extraction method for a type of a river channel provided by an embodiment of the present disclosure.

DETAILED DESCRIPTION OF THE EMBODIMENTS

In order to make the technical means, creative features, objectives to be achieved, and efficacy achieved by the disclosure easy to understand, the present disclosure will be further described below in combination with implementations.

In the description of the present disclosure, it should be noted that orientation or position relationships indicated by terms such as "upper", "lower", "inner", "outer", "front end", "rear end", "both ends", "one end" and "the other end" are described based on the accompanying drawings. These terms are merely intended to facilitate and simplify the description of the present disclosure, rather than to indicate or imply that the mentioned device or components must have a specific orientation or must be constructed and operated in a specific orientation. Therefore, these terms should not be understood as a limitation to the present disclosure. Moreover, terms such as "first" and "second" are merely intended for the purpose of description, and should not be construed as indicating or implying relative importance.

In the description of the present disclosure, it should be noted that, unless otherwise clearly specified and limited, meanings of terms "installed", "disposed with", and "connected with" should be understood in a board sense. For example, the "connection" may be a fixed connection, a removable connection, or an integral connection; may be a mechanical connection or an electrical connection; may be a direct connection or an indirect connection through an intermediate medium; or may be intercommunication between two components. Those of ordinary skill in the art may understand specific meanings of the foregoing terms in the present disclosure based on a specific situation.

With reference to FIG. 1, a remote sensing-based extraction method for a type of a river channel provided by the present disclosure includes the following steps.

S10, Multi-source remote sensing data of a target area including a river channel is obtained.

S20, The multi-source remote sensing data is preprocessed, and corresponding reflectance data is obtained.

S30, According to the reflectance data, a water index and a vegetation index of the target area are calculated.

S40, According to the water index and the vegetation index, the type of the river channel is determined.

The present disclosure aims to provide a seasonal dry river channel for monitoring and management of the ecological environment of river channels on the basis of fully considering change characteristics of an underlying surface of a seasonal dry river channel and a river channel in a wet season and a fluctuating period and spectral characterization of multi-source remote sensing data, and provides a remote sensing prediction method for predicting a type of a river channel on this basis, which has high identification accuracy of the type of the river channel.

The specific solution of the present disclosure will be described in detail below.

1. Data Preparation:

In steps S10 to S20, multi-source remote sensing data is collected, which may also include water system data, land use, and digital elevation model (DEM) data. Geometric, radiometric, and atmospheric correction processing is performed on the remote sensing data to obtain reflectance data, such as reflectance in a SWIR band, reflectance in a red light band, and reflectance in a NIR band.

2. Water Index and Vegetation Index:

In step S30, there are two cases.

First, for a remote sensing image with more than four bands:

an MNDWI model or an NDWI-NDVI model can be selected.

The MNDWI model is expressed as:

$$MNDWI = \frac{R_g - R_{swir}}{R_{swir} + R_g}. \quad (1)$$

In the formula (1), MNDWI is the modified normalized difference water index. $R_{swir}$ is reflectance in a SWIR band, and $R_g$ is reflectance in a red light band.

The NDWI-NDVI model is expressed as:

$$NDWI - NDVI = \frac{R_g - R_{nir}}{R_g + R_{nir}} - NDVI. \quad (2)$$

In the formula (2), NDVI is the normalized difference vegetation index, NDWI is the normalized difference water index, and $R_{nir}$ is reflectance in a NIR band.

Second, for a remote sensing image with four bands:

an NDVI model is selected.

$$NDVI = \frac{R_{nir} - R_r}{R_{nir} + R_r}. \quad (3)$$

In the formula (3), NDVI is the normalized difference vegetation index, and $R_{nir}$ is the reflectance in the NIR band. $R_r$ is reflectance in a red band.

3. Determination of Whether there is Water in the River Channel or Water System:

Two first preset conditions for determining whether there is water in the river channel are constructed according to the water index and the vegetation index in step S40.

(1) During Identification of a Pixel of a Non-Ice and Snow-Covered River Channel:

If $MNDWI_{t0} \geq a_1$ is satisfied, it is determined that the river channel is a river channel with water.

Or considering the impact of vegetation, if $MNDWI_{ti} < a_1$, $NDVI_{ti} \geq a_2$, $MNDWI_{ti-tj} \geq a_1$, and $NDVI_{ti-tj} < a_2$ are satisfied, it is determined that the river channel is a river channel with water when covered by vegetation.

$MNDWI_{t0}$, $MNDWI_{ti}$, $MNDWI_{ti-tj}$, $NDVI_{ti}$, and $NDVI_{ti-tj}$ are corresponding MNDWIs and NDVIs at times t0, ti, and ti-tj respectively. t0 is a time starting point of monitoring, ti and ti-tj are both any time points after the time starting point t0 of monitoring, and ti≠ti-tj.

$a_1$ and $a_2$ are a first preset threshold and a second preset threshold respectively. The values of $a_1$ and $a_2$ are related to the type of the remote sensing image and the numerical index of the remote sensing image respectively. The subsequent $a_3$-$a_8$ are related to the type of the remote sensing image and the numerical index of the remote sensing image. The determination of these thresholds is related to specific remote sensing images, which is not limited in the embodiment of the present disclosure.

A river channel that satisfies the above conditions is considered as a river channel with water. In order to avoid the occurrence of non-negative values, the following is established:

NDW=MNDWI+b$_1$.

In the formula, NDW is a non-negative water value, and bi is a preset threshold. The preset threshold is related to the type of remote sensing and communication resolution, and the appropriate value can be selected according to the specific situation.

(2) During Identification of a Pixel of an Ice and Snow-Covered River Channel:

An ice and snow coverage model index $$IS = \frac{R_g - R_{nir}}{R_{nir} + R_g}$$

and an ice and snow reflection intensity model index IT=$R_g^2$+$R_r^2$+$R_{nir}^2$ are constructed. If IS≥$a_3$ and IT≥$a_4$ are both satisfied, it is determined that the pixel is covered by ice and snow, that is, it is determined that the ice and snow-covered river channel is a river channel with water. $a_3$ and $a_4$ are a third preset threshold and a fourth preset threshold respectively.

4. Determination of Identification of Pixel of Non-Dry River Water:

Two second preset conditions for determining whether the river channel is a non-dry river channel are constructed according to the water index and the vegetation index in step S40.

(1) A non-dry river channel identification index for a non-ice and snow-covered season time series is established:

$$NISI = \sqrt{\sum_{i=1}^{n_1} \frac{(NDW_i - \overline{NDW})^2}{n_1}},$$

if $\overline{NDW}$≥$a_5$ is satisfied, it is determined that the pixel is a non-dry pixel, that is, it is determined that the river channel of the non-ice and snow-covered season time series is a non-dry river channel.

In the formula, NISI is a non-dry pixel index. $\overline{NDW}$ is an average value in a statistical time range. $a_5$ is a fifth preset threshold. $n_1$ is a number of statistical image scenes of the non-ice and snow-covered season time series. i is an index value of the number of the statistical image scenes of the non-ice and snow-covered season time series.

(2) A non-dry river channel identification model for an ice and snow-covered season time series is established:

$$ISI = \sqrt{\sum_{i=1}^{n_2} \frac{(IS_i - \overline{IS})^2}{n_2}},$$

if $\overline{IS}$≥$a_6$ is satisfied, and $$ITI = \sqrt{\sum_{i=1}^{n_2} \frac{(IT_i - \overline{IT})^2}{n_2}},$$

if $\overline{IT}$≥$a_7$ is satisfied, it is determined that the pixel is a non-dry pixel in the ice and snow-covered season, that is, it is determined that the river channel of the ice and snow-covered season time series is a non-dry river channel.

In the formula, ISI and ITI are an ice and snow coverage index and an ice and snow reflection intensity index respectively. $\overline{IS}$ and $\overline{IT}$ are an average ice and snow coverage model index and an average ice and snow reflection intensity model index in a statistical time range respectively. $a_6$ is a sixth preset threshold, and $a_7$ is a seventh preset threshold. $n_2$ is a number of statistical image scenes of the ice and snow-covered season time series.

If the above 4(1) and 4(2) are both satisfied, it is a non-dry river channel.

5. Identification of Pixel of Seasonal River Water:

A process of determining the type of the river channel in step S40 includes the following sub-steps.

A, If only one of 4(1) and 4(2) is satisfied, it is a seasonal water pixel, that is, it is determined that the channel is a non-dry river channel.

B, If 4(2) and 4(1) are not satisfied, but in a t1 to t2 time range of a precipitation season, the non-dry river channel identification index for the non-ice and snow-covered season time series is as follows:

$$NISI = \sqrt{\sum_{i=1}^{n_3} \frac{(NDW_i - \overline{NDW})^2}{n_3}},$$

if $\overline{NDW}$≥$a_8$ is satisfied, it is determined that the pixel is a non-dry pixel, that is, it is determined that the river channel is a seasonal dry river channel of the non-ice and snow-covered season time series. $n_3$ is a number of statistical pixels of the non-ice and snow-covered season time series in the t1 to t2 time range of the precipitation season.

6. Identification of Pixel of Temporary River Water:

During remote sensing monitoring of river water in a time series, if 3(1) in the first preset conditions for determining whether there is water in the river channel is satisfied within a certain time range, and a total time interval for monitoring water t is less than Δt1, and is not within the t1 to t2 time range of the precipitation season, it is determined that the pixel is a temporary river water pixel, that is, it is determined that the river channel is a temporary water channel. Δt1 is a preset time threshold. The preset time threshold is related to the frequency of acquisition and monitoring of remote sensing images, for example, it may be 14 days. It is not within the t1 to t2 range of the precipitation season. For example, in Beijing, it is not between July and August.

7. Identification of Pixel of Dry River Channel

If 3(1) or 3(2) in the first preset conditions for determining whether there is water in the river channel do not satisfy the conditions within the monitoring time range, it is determined that the pixel is a dry river pixel.

8. Identification of Length of River Water

Further, the method includes:

S50, If it is determined that there is water in the river channel, raster data corresponding to the remote sensing data of the river channel is vectorized to form a series of water patches. A length of the connected patches is calculated as a length of water existing in the river water within a certain time range.

If it is determined that there is water in the river channel, the above obtained raster data of the river channel is vectorized to form a series of water patches. Through the method of spatial analysis, if two adjacent patches exist: $\Delta l = \sqrt{(p_{x1}-p_{x2})^2+(p_{y1}-p_{y2})^2}$ and $\Delta l \leq a_8$, it is considered that the two patches are connected.

$\Delta l$ is a judgment example, $a_8$ is an eighth preset threshold, $(p_{x1}, p_{y1})$ is the coordinate value of the first patch, and $(p_{x2}, p_{y2})$ is the coordinate value of the second patch adjacent to the first patch. The length of the connected patches is calculated as the length of water existing in the river water within a certain time range.

The remote sensing-based extraction method for a type of a river channel provided by the present disclosure includes: obtaining multi-source remote sensing data of a target area including a river channel; preprocessing the multi-source remote sensing data, and obtaining corresponding reflectance data; according to the reflectance data, analyzing a water index and a vegetation index of the target area; and according to the water index and the vegetation index, determining the type of the river channel. The present disclosure has advantages that the present disclosure aims to provide a seasonal dry river channel for monitoring and management of the ecological environment of river channels on the basis of fully considering change characteristics of an underlying surface of a seasonal dry river channel and a river channel in a wet season and a fluctuating period and spectral characterization of multi-source remote sensing data, and provides a remote sensing prediction method for predicting a type of a river channel on this basis, which has high identification accuracy.

The above shows and describes the basic principles, main features, and advantages of the present disclosure. It should be understood by those skilled in the art that the present disclosure is not limited by the above embodiments, and the above embodiments and the description only illustrate the principle of the present disclosure. Various changes and modifications may be made to the present disclosure without departing from the spirit and scope of the present disclosure, and such changes and modifications all fall within the claimed scope of the present disclosure. The claimed protection scope of the present disclosure is defined by the appended claims and equivalents thereof.

What is claimed is:

1. A remote sensing-based extraction method for a type of a river channel, comprising:
   obtaining multi-source remote sensing data of a target area comprising a river channel;
   preprocessing the multi-source remote sensing data, and obtaining corresponding reflectance data;
   according to the reflectance data, calculating a water index and a vegetation index of the target area; and
   according to the water index and the vegetation index, determining the type of the river channel.

2. The remote sensing-based extraction method for a type of a river channel according to claim 1, wherein the preprocessing the multi-source remote sensing data comprises:
   performing geometric, radiometric, and atmospheric correction processing on the multi-source remote sensing data.

3. The remote sensing-based extraction method for a type of a river channel according to claim 2, further comprising:
   if it is determined that there is water in the river channel, vectorizing raster data corresponding to the remote sensing data of the river channel to form a series of water patches; and calculating a length of the connected patches as a length of water existing in the river water within a certain time range.

4. The remote sensing-based extraction method for a type of a river channel according to claim 1, wherein the calculating a water index and a vegetation index of the target area comprises:
   if the multi-source remote sensing data is a remote sensing image with more than four bands, obtaining a normalized difference vegetation index (NDVI) and an modified normalized difference water index (MNDWI); and
   if the multi-source remote sensing data is a remote sensing image with four bands, obtaining an NDVI and a normalized difference water index (NDWI)-NDVI.

5. The remote sensing-based extraction method for a type of a river channel according to claim 4, further comprising:
   if it is determined that there is water in the river channel, vectorizing raster data corresponding to the remote sensing data of the river channel to form a series of water patches; and calculating a length of the connected patches as a length of water existing in the river water within a certain time range.

6. The remote sensing-based extraction method for a type of a river channel according to claim 4, wherein the MNDWI is expressed as:

$$MNDWI = \frac{R_g - R_{swir}}{R_{swir} + R_g}, \quad (1)$$

wherein in the formula (1), MNDWI is the modified normalized difference water index; and $R_{swir}$ is reflectance in a short-wave infrared (SWIR) band, and $R_g$ is reflectance in a red light band; and
the NDWI-NDVI is expressed as:

$$NDWI - NDVI = \frac{R_g - R_{nir}}{R_g + R_{nir}} - NDVI, \quad (2)$$

wherein in the formula (2), NDVI is the normalized difference vegetation index, NDWI is the normalized difference water index, and $R_{nir}$ is reflectance in a near-infrared (NIR) band.

7. The remote sensing-based extraction method for a type of a river channel according to claim 6, further comprising:
   if it is determined that there is water in the river channel, vectorizing raster data corresponding to the remote sensing data of the river channel to form a series of water patches; and calculating a length of the connected patches as a length of water existing in the river water within a certain time range.

8. The remote sensing-based extraction method for a type of a river channel according to claim 6, wherein the NDVI is expressed as:

$$NDVI = \frac{R_{nir} - R_r}{R_{nir} + R_r}, \quad (3)$$

wherein in the formula (3), NDVI is the normalized difference vegetation index, and $R_{nir}$ is the reflectance in the NIR band; and $R_r$ is reflectance in a red band.

9. The remote sensing-based extraction method for a type of a river channel according to claim 8, further comprising:

if it is determined that there is water in the river channel, vectorizing raster data corresponding to the remote sensing data of the river channel to form a series of water patches; and calculating a length of the connected patches as a length of water existing in the river water within a certain time range.

10. The remote sensing-based extraction method for a type of a river channel according to claim 8, wherein the determining the type of the river channel comprises:
according to the water index and the vegetation index, constructing first preset conditions for determining whether there is water in the river channel and second preset conditions for determining whether the river channel is a non-dry river channel to determine the type of the river channel.

11. The remote sensing-based extraction method for a type of a river channel according to claim 10, further comprising:
if it is determined that there is water in the river channel, vectorizing raster data corresponding to the remote sensing data of the river channel to form a series of water patches; and calculating a length of the connected patches as a length of water existing in the river water within a certain time range.

12. The remote sensing-based extraction method for a type of a river channel according to claim 10, wherein the first preset conditions for determining whether there is water in the river channel comprise:
1) during identification of a pixel of a non-ice and snow-covered river channel, if $MNDWI_{t0} \geq a_1$ is satisfied, or $MNDWI_{ti} < a_1$, $NDVI_{ti} \geq a_2$, $MNDWI_{ti-tj} \geq a_1$, and $NDVI_{ti-tj} < a_2$ are satisfied, determining that the river channel is a river channel with water, wherein $MNDWI_{t0}$, $MNDWI_{ti}$, $MNDWI_{ti-tj}$, $NDVI_{ti}$, and $NDVI_{ti-tj}$ are corresponding MNDWIs and NDVIs at times t0, ti, and ti-tj respectively; and $a_1$ and $a_2$ are a first preset threshold and a second preset threshold respectively; and
2) during identification of a pixel of an ice and snow-covered river channel, constructing an ice and snow coverage model index $$IS = \frac{R_g - R_{nir}}{R_{nir} + R_g}$$

and an ice and snow reflection intensity model index $IT = R_g^2 + R_r^2 + R_{nir}^2$, and if $IS \geq a_3$ and $IT \geq a_4$, determining that the ice and snow-covered river channel is a river channel with water, wherein $a_3$ and $a_4$ are a third preset threshold and a fourth preset threshold respectively.

13. The remote sensing-based extraction method for a type of a river channel according to claim 12, further comprising:
if it is determined that there is water in the river channel, vectorizing raster data corresponding to the remote sensing data of the river channel to form a series of water patches; and calculating a length of the connected patches as a length of water existing in the river water within a certain time range.

14. The remote sensing-based extraction method for a type of a river channel according to claim 12, wherein the second preset conditions for determining whether the river channel is a non-dry river channel comprise:

3) establishing a non-dry river channel identification index for a non-ice and snow-covered season time series:

$$NISI = \sqrt{\sum_{i=1}^{n_1} \frac{(NDW_i - \overline{NDW})^2}{n_1}},$$

if $\overline{NDW} \geq a_5$ is satisfied, determining that the river channel of the non-ice and snow-covered season time series is a non-dry river channel, wherein in the formula, NISI is a non-dry pixel index; NDW is a non-negative water value, $NDW = MNDWI + b_1$, wherein $b_1$ is a preset threshold; $\overline{NDW}$ is an average value in a statistical time range; $a_5$ is a fifth preset threshold; $n_1$ is a number of statistical image scenes of the non-ice and snow-covered season time series; and i is an index value of the number of the statistical image scenes of the non-ice and snow-covered season time series; and 4) establishing a non-dry river channel identification model for an ice and snow-covered season time series:

$$ISI = \sqrt{\sum_{i=1}^{n_2} \frac{(IS_i - \overline{IS})^2}{n_2}},$$

if $\overline{IS} \geq a_6$ is satisfied, and $$ITI = \sqrt{\sum_{i=1}^{n_2} \frac{(IT_i - \overline{IT})^2}{n_2}},$$

if $\overline{IT} \geq a_7$ is satisfied,
determining that the river channel of the ice and snow-covered season time series is a non-dry river channel, wherein
in the formula, ISI and ITI are an ice and snow coverage index and an ice and snow reflection intensity index respectively; $\overline{IS}$ and $\overline{IT}$ are an average ice and snow coverage model index and an average ice and snow reflection intensity model index in a statistical time range respectively; $a_6$ is a sixth preset threshold, and $a_7$ is a seventh preset threshold; and $n_2$ is a number of statistical image scenes of the ice and snow-covered season time series.

15. The remote sensing-based extraction method for a type of a river channel according to claim 14, further comprising:
if it is determined that there is water in the river channel, vectorizing raster data corresponding to the remote sensing data of the river channel to form a series of water patches; and calculating a length of the connected patches as a length of water existing in the river water within a certain time range.

16. The remote sensing-based extraction method for a type of a river channel according to claim 14, wherein the process of determining the type of the river channel comprises:
A, if 3) and 4) in the second preset conditions for determining whether the river channel is a non-dry river channel are both satisfied, determining that the river channel is a non-dry river channel;
B, if only one of 3) and 4) in the second preset conditions for determining whether the river channel is a non-dry river channel is satisfied, determining that the river channel is a seasonal dry river channel; or if 3) and 4) in the second preset conditions for determining whether the river channel is a non-dry river channel are not satisfied, but in a t1 to t2 time range of a precipitation season, the non-dry river channel identification index for the non-ice and snow-covered season time series is as follows:

$$NISI = \sqrt{\sum_{i=1}^{n_3} \frac{(NDW_i - \overline{NDW})^2}{n_3}},$$

if $\overline{NDW} \geq a_8$ is satisfied, determining that the river channel is a seasonal dry river channel of the non-ice and snow-covered season time series, wherein NISI is the non-dry river channel identification index; and $n_3$ is a number of statistical pixels of the non-ice and snow-covered season time series in the t1 to t2 time range of the precipitation season; and C, during remote sensing monitoring of river water in a time series, if 1) in the first preset conditions for determining whether there is water in the river channel is satisfied within a certain time range, and a total time interval for monitoring water t is less than $\Delta t1$, and is not within the t1 to t2 time range of the precipitation season, determining that the river channel is a temporary water channel, wherein $\Delta t1$ is a preset time threshold.

17. The remote sensing-based extraction method for a type of a river channel according to claim 16, further comprising:
if it is determined that there is water in the river channel, vectorizing raster data corresponding to the remote sensing data of the river channel to form a series of water patches; and calculating a length of the connected patches as a length of water existing in the river water within a certain time range.

18. The remote sensing-based extraction method for a type of a river channel according to claim 1, further comprising:
if it is determined that there is water in the river channel, vectorizing raster data corresponding to the remote sensing data of the river channel to form a series of water patches; and calculating a length of the connected patches as a length of water existing in the river water within a certain time range.

\* \* \* \* \*